No. 731,147. PATENTED JUNE 16, 1903.
W. T. WOODYARD.
PRUNING IMPLEMENT.
APPLICATION FILED MAR. 7, 1902.
NO MODEL.
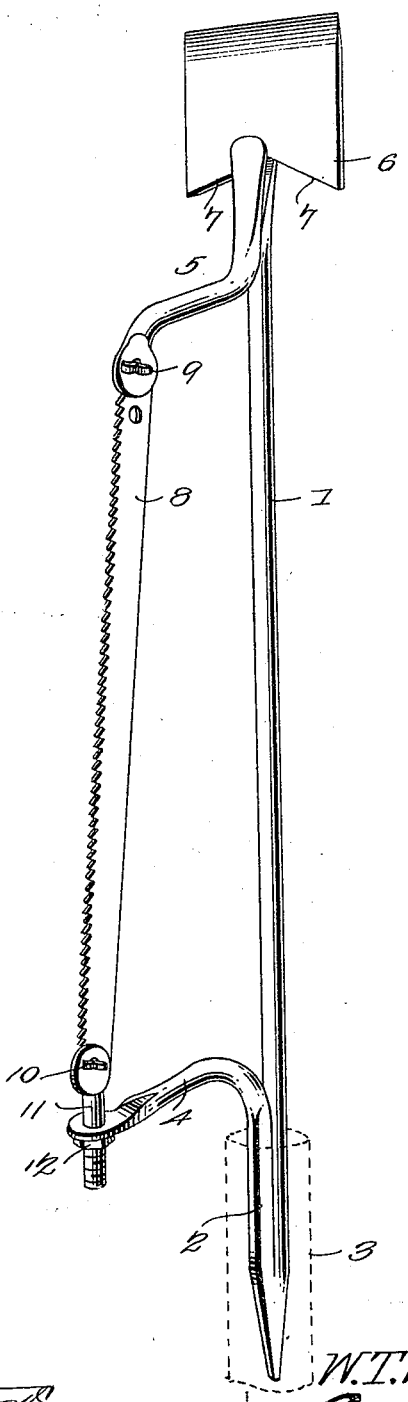
Witnesses
W. T. Woodyard, Inventor.
by C. A. Snow & Co.
Attorneys No. 731,147. Patented June 16, 1903.

UNITED STATES PATENT OFFICE.

WILLIAM T. WOODYARD, OF REEDY, WEST VIRGINIA.

PRUNING IMPLEMENT.

SPECIFICATION forming part of Letters Patent No. 731,147, dated June 16, 1903.

Application filed March 7, 1902. Serial No. 97,160. (No model.)

*To all whom it may concern:*

Be it known that I, WILLIAM T. WOODYARD, a citizen of the United States, residing at Reedy, in the county of Roane and State of West Virginia, have invented a new and useful Pruning Implement, of which the following is a specification.

This invention relates to a pruning implement.

The object of the invention is to provide a pruning implement which with readiness and ease may be manipulated to sever heavy limbs and lop off branches and twigs.

A further object is to provide a novel form of frame of a construction that will permit of its being readily repaired in case of breakage.

With these and other objects in view, as will appear as the nature of the invention is better understood, the same consists in the novel construction and combination of parts of a pruning implement, as will be hereinafter fully described and claimed.

In the accompanying drawing, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in the drawing the figure is a view in perspective of an implement characterized by this invention.

The implement constitutes a combined saw and knife. The saw-frame, which embodies one of the essential features of the invention, is constructed with a view of being readily repaired should either of the saw carrying arms be broken or the knife destroyed or worn out. To effect this, the back or shank 1 has a portion of its length bent upon itself to present a stem 2 for insertion within a suitable handle 3, (indicated by dotted lines,) and then bent outward at an angle to the shank to present the rear saw-carrying arm 4. The front saw-carrying arm 5 is of less height than the rear arm and is inclined toward it in order to yield under heavy thrusts, and thus protect the saw from danger of breakage. The arm 5 is connected with the shank by being welded thereto, and between it and the shank is secured a knife 6, the same in this instance being held in position by being welded to the extremities of the shank and the arm 5, although, if preferred, it may be associated therewith by rivets. The upper edge of the knife is reduced to present a cutting edge, as usual, and the lower edge of the knife is formed into two angularly-disposed shoulders 7, which operate as hooks to effect pulling down from the tree a limb or branch that has been severed. These shoulders 7 are herein shown as blunt, but it is to be understood that, if preferred, they may be sharpened to present adjunctive knives, and as this will be readily understood detailed illustration thereof is deemed unnecessary.

From the description thus far given it will be seen that if breakage of either of the arms occurs a new one may readily be supplied by a blacksmith, or if the knife be injured or wears out from long-continued use a new one may be supplied.

The saw 8, which may be of any preferred character, is herein shown as held in position with the arm 5 by a split rivet 9, although any other suitable form of fastening device may be employed, the opposite end of the saw being similarly secured by a rivet 10 with a saw-tightening bolt 11, the adjusting-nut 12 of which bears against the outer portion of the arm 4 and operates in the well-known manner to place and retain the saw under the desired tension. The saw-tightening bolt is circular in cross-section in that portion that works in the saw-carrying arm, whereby the said bolt will turn where torsional strain is applied to the saw, thereby preventing the same from breaking and enabling it to conform itself to the movements of a swinging limb.

In the use of this implement heavy limbs and branches will be severed by the saw 8 and small branches will be lopped off by the knife 6. Should a branch that has been severed become entangled with the limbs of the tree, it may be readily drawn to the ground by being engaged by one of the hooks 7. The object of having the saw disposed at an angle to the shank and nearer to the knife-bearing end thereof than to the stem-bearing end is to permit the implement being inserted between two boughs or branches that are close together, and a further and most important function accruing from this arrangement is that as the cut is made on the thrust and not on the draw of the saw the latter will always be moving toward the limb, thereby lessening the amount of labor necessary to press the saw against the limb. In other words, the arrangement of the saw shown, results in a wedge action under use, and this is of importance for the reasons stated. The saw is still further protected from danger of breakage by the use of the saw-carrying arms or brackets, which will yield under dangerous strain, and thus shield the saw from injury.

It will be seen from the foregoing description that by constructing the frame of the implement as set forth a thoroughly-effective frame is presented and one that may readily be repaired in case of damage. Furthermore, the implement will be thoroughly effective in sawing or lopping off branches at a considerable height above the operator with the expenditure of the minimum of labor.

Having thus fully described my invention, what I claim as new, and desire to secure by Letters Patent, is—

1. The combination in a pruning implement of a saw-frame and a saw having one end rigidly fastened to said frame and the other end swiveled to permit partial rotation of that end of the saw in the frame.

2. The combination in a pruning implement of a saw-frame having a short upper arm and a relatively long lower arm, and a saw having one end rigidly fastened to the short arm and swiveled to the long arm to permit partial rotation of the swiveled end.

3. The combination in a pruning implement of a saw-frame having a knife welded to the upper end thereof and a saw having one end rigidly fastened to said frame and the other end swiveled to permit partial rotation of that end of the saw.

In testimony that I claim the foregoing as my own I have hereto affixed my signature in the presence of two witnesses.

WILLIAM T. WOODYARD.

Witnesses:
 ALBERT GOUGH,
 PERDY SMITH.